(12) United States Patent
Rist (10) Patent No.: US 6,311,925 B1
(45) Date of Patent: Nov. 6, 2001

(54) AIRSHIP AND METHOD FOR TRANSPORTING CARGO

(75) Inventor: Robert L. Rist, Mantua, OH (US)

(73) Assignee: Ohio Airships, Inc., Mantua, OH (US)

( * ) Notice: Subject to any disclaimer, the term of this patent is extended or adjusted under 35 U.S.C. 154(b) by 0 days.

(21) Appl. No.: 09/329,398

(22) Filed: Jun. 10, 1999

(51) Int. Cl.[7] .................................................. B64B 1/34
(52) U.S. Cl. ............................. 244/30; 244/96; 244/125
(58) Field of Search .......................... 244/30, 128, 126, 244/127, 97, 96, 61, 125, 117 R, 119

(56) References Cited

U.S. PATENT DOCUMENTS

| | | | |
|---|---|---|---|
| Re. 28,454 | * 6/1975 | Fitzpatrick et al. | 244/30 |
| 1,191,077 | * 7/1916 | Hermanson | 244/127 |
| 1,510,427 | * 9/1924 | Unger | 244/125 |
| 1,648,935 | * 11/1927 | Campau | 244/30 |
| 1,653,904 | * 12/1927 | Hall | 244/97 |
| 1,673,497 | * 6/1928 | Durr | 244/128 |
| 1,684,425 | * 9/1928 | Wheeler | 244/127 |
| 1,824,453 | * 9/1931 | Warth | 244/127 |
| 1,835,260 | * 12/1931 | Barrera | 244/125 |
| 1,844,765 | * 2/1932 | Jackson | 244/125 |
| 1,852,987 | * 4/1932 | Tyler | 244/97 |
| 1,862,606 | * 6/1932 | Peterson | 244/125 |
| 1,902,519 | * 3/1933 | Powelson et al. | 244/97 |
| 1,988,328 | * 1/1935 | Noelle | 244/125 |
| 3,185,411 | * 5/1965 | Gembe | 244/97 |
| 3,779,487 | * 12/1973 | Ashton et al. | 244/123 |
| 3,978,256 | * 8/1976 | James | 244/123 |
| 4,052,025 | 10/1977 | Clark et al. | . |
| 5,096,141 | * 3/1992 | Schley | 244/97 |
| 5,285,986 | * 2/1994 | Hagenlocher | 244/97 |
| 5,516,065 | 5/1996 | Hagenlocher | . |
| 5,823,468 | * 10/1998 | Bothe | 244/125 |
| 5,890,676 | * 4/1999 | Coleman et al. | 244/128 |
| 6,196,498 | 3/2001 | Eichstedt et al. | 244/5 |

OTHER PUBLICATIONS

Article from the Akron Beacon Journal dated Thursday, May 18, 2000 entitled "Cargo Lifter AG Shoots for the Sky With Transport Ship."

Transport web page at http://www.cargolifter.com/clhomepages/clhp97v4/e/Transport.htm.

Hybrid Heavy–Lift Vehicle Under Study by Donald E. Fink.

Evaluation of Advanced Airship Concepts by Bruno A. Joner and John J. Schneider.

* cited by examiner

*Primary Examiner*—Galen L. Barefoot
(74) *Attorney, Agent, or Firm*—Emerson & Skeriotis; Roger D. Emerson; Timothy D. Bennett (57) ABSTRACT

A lighter than air airship is disclosed that has an internal weight supporting structure. The weight supporting structure allows the airship to enjoy the advantages of both static and dynamic lift. The airship disclosed herein is lifted by both lighter than air gasses as well as wings attached to the internal weight supporting structure. A cargo container for use with the airship is also disclosed.

21 Claims, 9 Drawing Sheets

AIRSHIP AND METHOD FOR TRANSPORTING CARGO

BACKGROUND OF THE INVENTION

1. Field of Invention

This invention pertains to the art of aircraft that can transport substantial amounts of cargo, and more particularly, to lighter than air (LTA) aircraft that can perform this function.

2. Description of the Related Art

Jet cargo planes have developed as one way to transport large amounts of cargo. For example, the 707 freighter was introduced by Boeing around 1977. Boeing has more recently introduced the 747. The 747 was designed to serve as an all-cargo transport. 747's are able to carry 100 tons (90,000 kg) of cargo.

Lighter than air (hereafter "LTA") airships are generally known, but their ability to successful transport substantial amounts of cargo has, until now, been limited. U.S. Pat. No. 4,052,025 discloses a large semi-buoyant lift-augmented aircraft. The Jul. 24, 1974 issue of "Aviation Week & Space Technology" discloses a hybrid heavy-lift, semi-lighter than air vehicle dubbed the Megalifter. The American Institute of Aeronautics and Astronautics' conference held in Snowmass, Colo. on Jul. 15–17, 1975 resulted in the AIAA Paper No. 75-930 which discloses "An Evaluation of Advanced Airship Concepts." This paper discloses multiple LTA aircrafts.

Lighter-than-air aircraft have been proposed by companies such as CargoLifters of Germany. Historically, these aircraft only use static lifting to create lift. Static lifting refers to lift created by lighter than air gasses, such as helium, in the aircraft. These make the airship buoyant, thereby providing static lift. However, because only static lift is used, these LTA have been capable of carrying only light payloads in relation to their size. The current invention utilizes dynamic lift as well as static lift and is therefore able to carry substantially heavier payloads. Dynamic lifting refers to lift created by air rushing over the wings of an aircraft.

LTA aircraft of the related art have not utilized dynamic lift because the structure of these aircraft could not withstand the forces created by dynamic lift. Because the airships were not sufficiently rigid, potential deformation of the fuselage did not permit the use of dynamic lift. The extreme forces exerted on the fuselage would cause it to collapse. Additionally, the designs of the related art are not as safe or stable as the current invention. Moreover, the current invention can carry heavier payloads and is less expensive to manufacture, operate and maintain than the historical LTA airships of the related art.

Typically, to provide static lift, the LTA aircraft of the related art, have used a constant differential pressure envelope to contain the buoyant gas. LTA aircraft or blimps such as the Goodyear blimp as operated by the Goodyear Tire & Rubber Co., modulate their volume of helium according to altitude and temperature. They have systems that allow the blimp to "inhale and exhale" in order to keep the volume and the shape of the airfoil constant. Balloonetts are commonly used for this purpose. The balloonetts also keep ambient air away from the helium, which prevents mixing and contaminating the helium. The ballonets units have very low operating ceilings, because pressure and altitudes pressure changes can effect the shape of the fuselage and lift. For these reasons, these systems do not offer promise for meeting the demand of transporting heavy volumes of goods.

A previous commercially available LTA airship was the giant Zeppelin Hindenburg built approximately 1937. This was an airship capable of lifting 230 tons. However, for such blimps to provide such lifting capabilities, these structures, that utilize only static lift, must be mammoth. This immense size, however, presents great problems and disadvantages. Atmospheric forces, such as wind, will force such an airship to fight a constant battle for direction. To counter such forces, the propulsion systems must be powerful. However, powerful propulsion systems are typically heavy and result in inefficient fuel usage. Additionally, these vector thrust type propulsion systems are typically cumbersome and have many mechanical difficulties.

For the foregoing reasons, the current state of the art does not offer promise for meeting the demand of transporting heavy volumes of goods. To solve such problems, a new type of aircraft has been developed. This aircraft utilizes dynamic as well as static lift to stow and transport cargo. This aircraft provides the means to achieve a constant envelope, allowing pressure to vary with altitude and temperature without compromising the structural integrity of the fuselage. Other means are used to achieve inherent stability and enhanced maneuverability, both in flight and on the ground. Higher altitudes can be achieved and a variety of missions can be provided when these types of characteristics are achieved. Safety factors can be achieved by protecting the internal helium cells.

SUMMARY OF THE INVENTION

The need to transport large volumes of parcels over the globe has put demands on the current modes of transportation. Growing demands far exceed the present designs. Conventional aircraft lifting capability are limited to present technology. Limitations, as in cost of fuels, engine size, runway lengths available, and the ever-increasing age of the mechanical systems and their structural integrates, directly limit the usefulness of increasing the load capability.

The current invention enables LTA aircraft to economically and safely transport substantial amounts of cargo over substantial distances by incorporating an internal structure into the airship. This internal structure gives the airship sufficient structural integrity so that wings may be added to the airship. Thus, the airship of the present invention enjoys the advantages of dynamic as well as static lift. This gives the current invention outstanding performance characteristics that are vastly superior to those of the related art. The preferred embodiment of the current invention may carry hundreds of tons of cargo. This may, for example, be equivalent to multiple loaded semi-tractor trailers or thousands of people.

The current invention also strikes an important balance between the weight, size and buoyancy of LTA aircraft. The relationships between the weight and size and buoyancy of aircraft are important. If the buoyancy of the aircraft is increased to offset its weight, the aircraft becomes susceptible to the adverse effects of wind conditions. This may make the aircraft very difficult to hold down or load and unload. Alternatively, if the buoyancy is reduced to minimize the problem, greater aerodynamic lift is needed from the wings to get the airship off the ground. This increases the size, power and thrust requirements of the engines. It also increases the required length of the runway. These requirements make the aircraft less useful and less efficient. Because the current invention strikes a balance, it is efficient and has many practical applications. It is able to efficiently carry substantial amounts of cargo over substantial distances. The current invention can do this while not requiring an excessive amount of thrust or a long runway to take off or land, known more commonly in the art as short take off and landing (STOL).

A problem found in most shipping systems is that cargo has to be loaded internally into the interior of the transporting vehicle, thus the ship has to be opened and loaded. In the case of ocean-going ships, the ship has to be loaded at a dock where loading and unloading systems are available. Refueling also takes a long time. The current invention's container is pre-loaded at the docking area and is ready to be picked up. The airship drops the container that had previously been attached to the airship and simultaneously picks up a new container by attaching to it. The new container also contains all the fuel for the next flight as well as spare helium, thus ending the need for refueling and "topping off" the helium. The airship can replenish its fuel supply from the new fuel from the new container. Fuel replenishing can be accomplished in the air. If the airship is caught on the ground in heavy storm conditions, a lower ballast system in the cargo container is floodable for extra containment weight. This merely requires the introduction of water or other heavy liquid into the empty ballast chamber of the cargo container. This may be accomplished in any manner chosen with sound engineering judgment, such as with a water hose, for example. There is no need for mooring systems. The preferred embodiment can remain safely moored, without ballast weight, in winds of up to 40 mph.

Other advantages of the current invention include increased accessibility to land-locked and manufacturing areas, decreased air pollution, decreased burden on roads and railways, less expensive shipping, disaster relief systems, elimination of the need to build new roads in remote areas, environmental research, safe crime and security watch systems, search and rescue systems, animal habitat research, air defense communication platform by mounting an antenna in the airship, quick deployment of heavy equipment and supplies, enemy surveillance systems, evacuation systems of up to 1000 men at one time, construction at remote sites by delivering workers and supplies to the sites, fast loading and unloading (under one hour), large increases in volume and weight carrying capability, safe helium gas at low pressures, increased structural stiffness, high operating ceilings providing less wind resistance and more efficient engine operation, less runway damage and reduced runway length requirements.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DESCRIPTION OF THE PREFERRED EMBODIMENT

Figure 1:
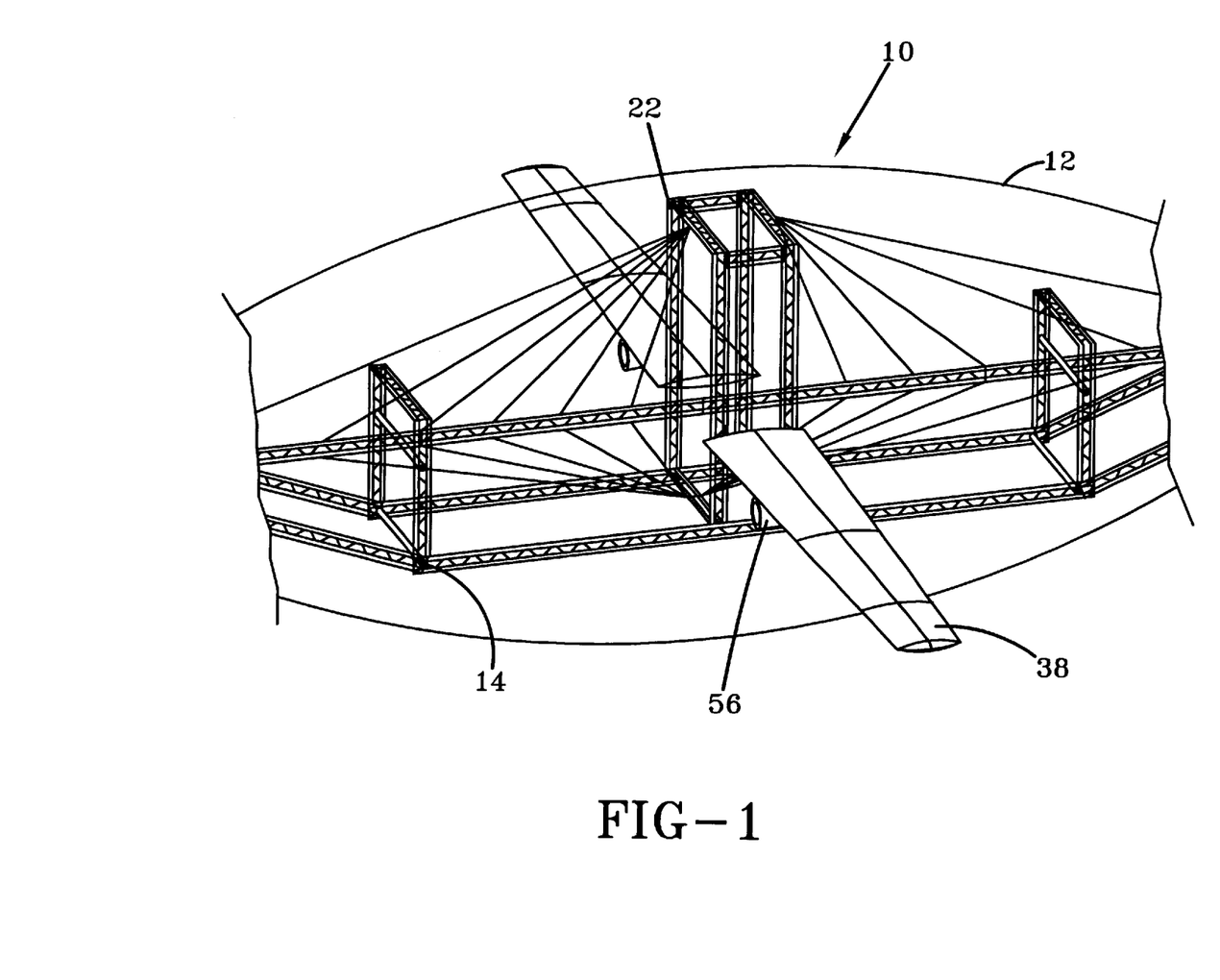
FIG. 1 is a perspective view showing the supporting structure of the current invention.
Figure 5:
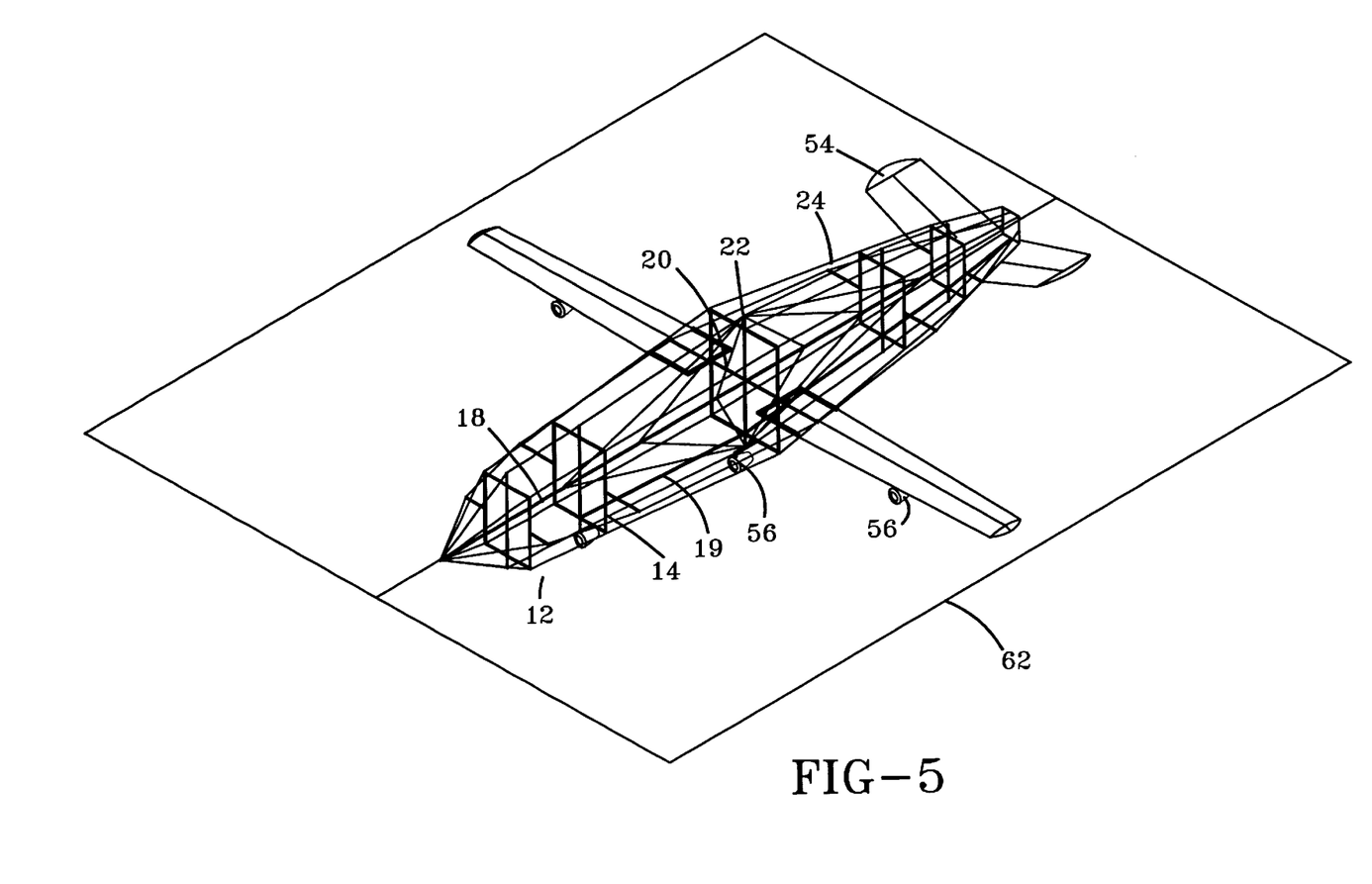
FIG. 5 is a perspective view showing the current invention.
Figure 6:
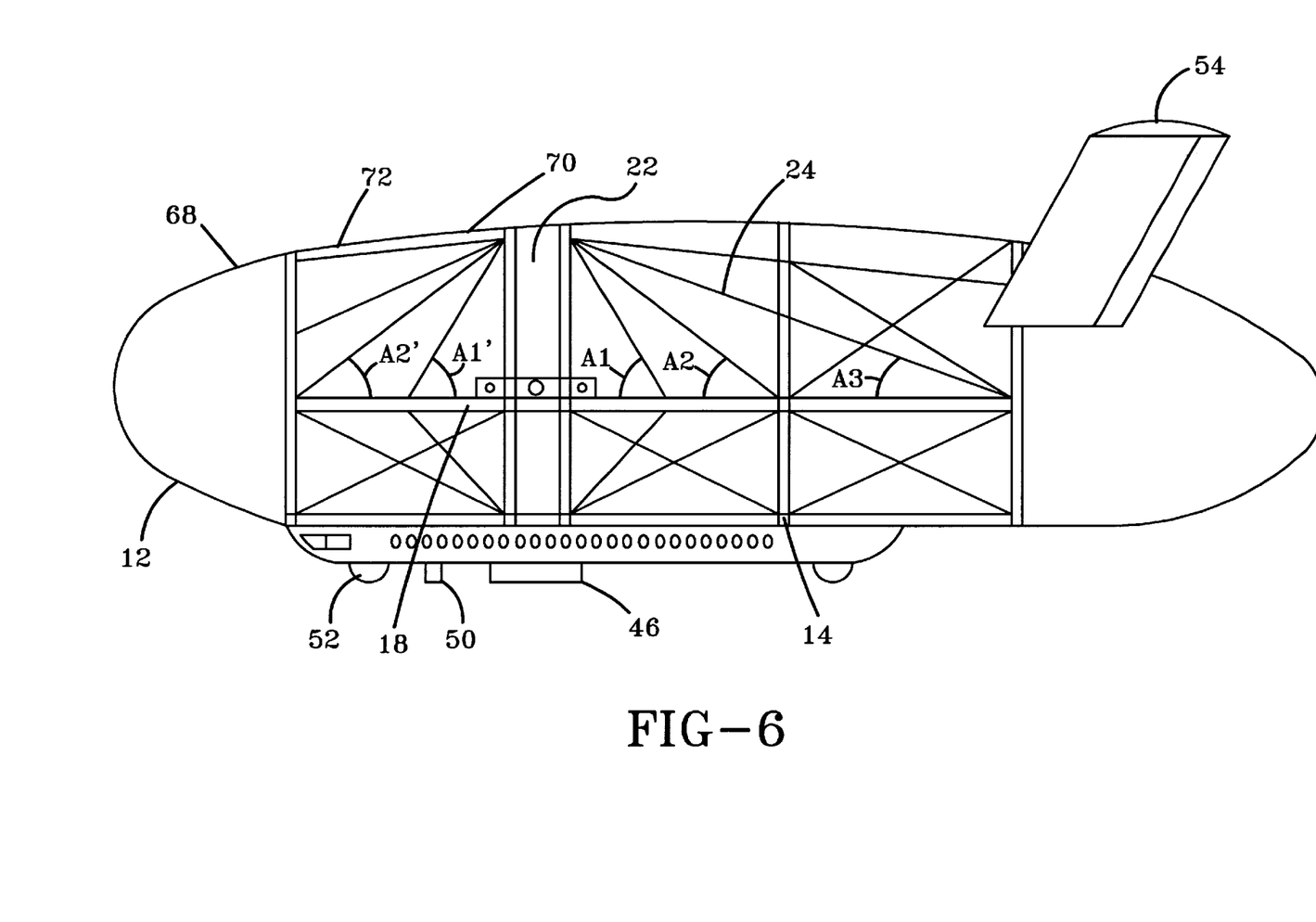
FIG. 6 is a side view of the current invention.

Referring now to the drawings wherein the showings are for purposes of illustrating a preferred embodiment of the invention only and not for purposes of limited the same, FIGS. 1, 5, and 6 shows the airship 10 comprising a fuselage 12 and a semi-rigid weight supporting structure 14 internal to the fuselage 12. The supporting structure 14 supports the airship 10 against lifting forces and the weight of cargo 16. Preferably, a skin 68 conforms the fuselage into an airfoil shape thereby reducing drag and increasing dynamic lift and operating efficiencies. A preferred skin material is Dacron of about two ounces per yard. A highly reflective material 70 should be installed on the upper outside 72 of the fuselage 12 to reflect energy from the sun. This will assist with internal temperature regulation and thereby prevent unwanted changes in pressure and buoyancy.

Figure 10:
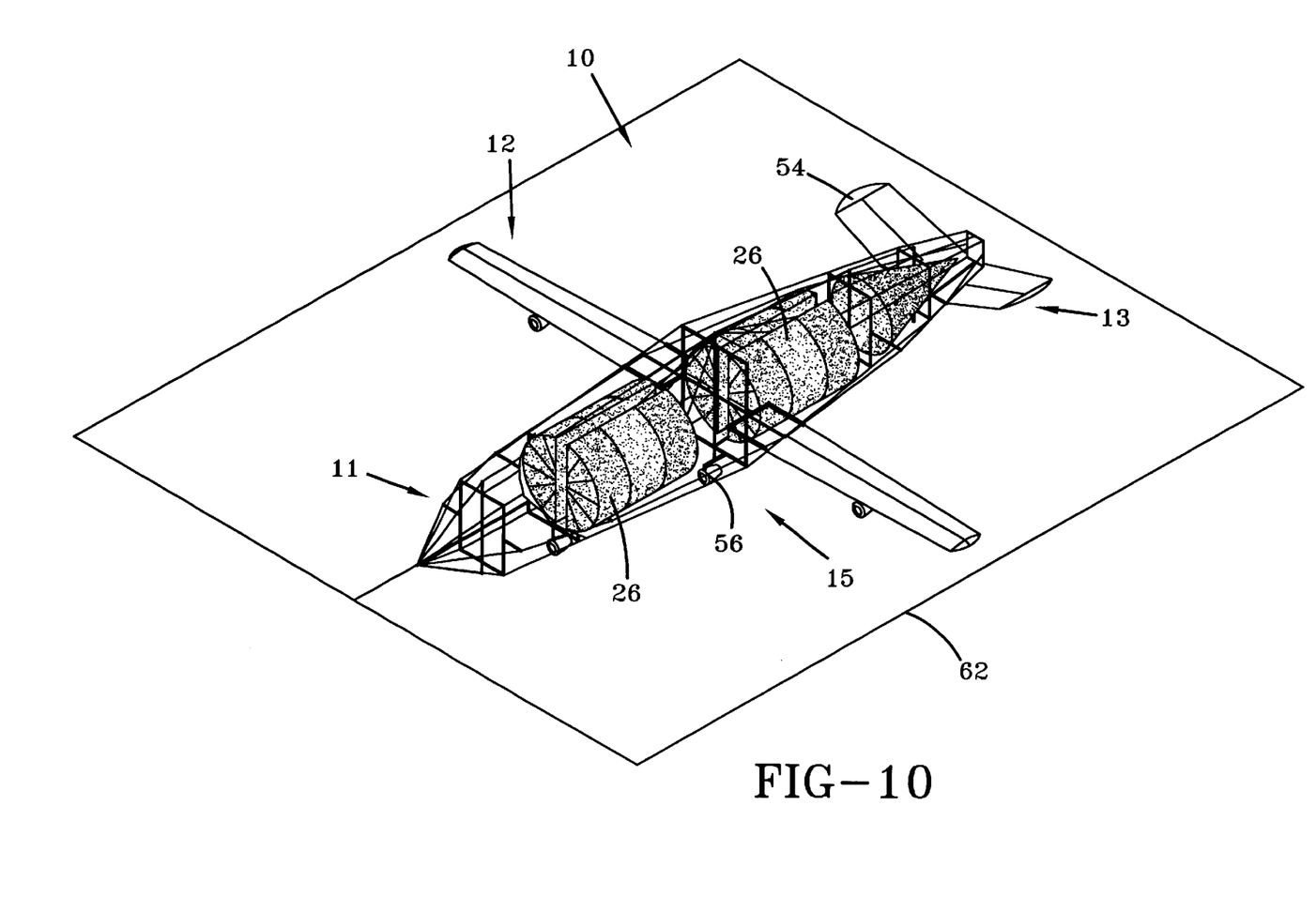
FIG. 10 is another perspective view showing the current invention.

With reference to FIGS. 1, 5, 6 and 9, the weight supporting structure 14 includes a first longitudinal member 18 that is substantially side-to-side centered and top-to-bottom centered within the fuselage 12 and a cross member 20 substantially perpendicular to and supportively connected to the longitudinal member 18. Preferably, the cross member 20 crosses the first longitudinal member 18 near the airship's 10 center of gravity. In the preferred embodiment, the first longitudinal member 18 and the cross member 20 lie substantially within a plane 62. (FIGS. 5 and 10). The weight supporting structure 14 further comprises a plumb member 22 substantially perpendicular to the plane 62. The plumb member 22 is supportively connected to the first longitudinal member 18 and the cross member 20 near the airship's 10 center of gravity.

As seen in FIG. 5, the preferred supporting structure 14 also includes a second longitudinal member 19. As shown, the second longitudinal member 19 is substantially side-to-side centered within a lower half of the fuselage 12. As also shown, the second longitudinal member 19 is substantially parallel to the first longitudinal member 18 and is supportively connected to a first end of the plumb member 22.

The weight supporting structure 14 also comprises a plurality of guide supports 24. The guide supports 24 supportively interconnect the fuselage 12 to the longitudinal 18, 19 cross 20 and plumb 22 members. These supports 24 also supportively interconnect the longitudinal 18, 19 cross 20 and plumb 22 members to each other. The guide supports 24 carry weight stress from lift of the wings 38 and dead weight of the cargo 16 throughout the entire ship's weight supporting structure 14. Stresses are transferred over the entire airship 10 via the guide support system 24. Guide supports 24 also absorb appreciable torsional loading and assist in transferring the payload weight to the weight supporting structure 14.

As seen best in FIGS. 1 and 6, the first ends of the guide supports 24 are attached to the top portion of the plumb member 22. The second ends of many of the guide supports 24 are attached along the length of the longitudinal member 18. This arrangement of the weight supporting structure 14 is called "Cable Stayed Bridge Construction" and is known to be applied in the field of bridges. As shown, the guide supports 24 form an acute angle A with the longitudinal member 18. In the preferred embodiment shown, these angles decrease as the second ends of the guide supports 24 are spaced away from the plumb member 22. Thus, angle A1 is larger than angle A2, which is larger than angle A3. It is also preferred, though not required, that the guide supports 24 be arranged symmetrically about the plumb member 22 throughout the available length of the longitudinal member 18. Thus, it is preferred that angle A1 is substantially equal to angle A1' and angle A2' is substantially equal to angle A2, as shown. Preferably, the guide support arrangement just described is also provided below the longitudinal member 18. In this way, as shown in FIGS. 1 and 6, additional support members 24 have first ends attached to the bottom portion of the plumb member 22 and second ends attached along the length of the longitudinal member 18. Most preferably, the guide support arrangement below the longitudinal member 18 is a mirror image to the guide support arrangement above the longitudinal member 18. The embodiment shown in FIG. 1 shows that the guide supports 24 above the longitudinal member 18 are substantially the same length as the guide supports 24 below the longitudinal member 18 and also shows that the second ends of the guide supports 24 (both above and below the longitudinal member 18) are attached at substantially the same longitudinal position along the longitudinal member 18. The embodiment shown in FIG. 6 shows that the guide supports 24 above the longitudinal member 18 are substantially longer than the guide supports 24 below the longitudinal member 18; yet, the second ends of the guide supports 24 (both above and below the longitudinal member 18) are attached at substantially the same longitudinal position along the longitudinal member 18. It should also be noted that, for the embodiment shown in FIG. 6, the plumb member 22 has a substantially greater cross-sectional size than any other vertically positioned member.

Figure 7:
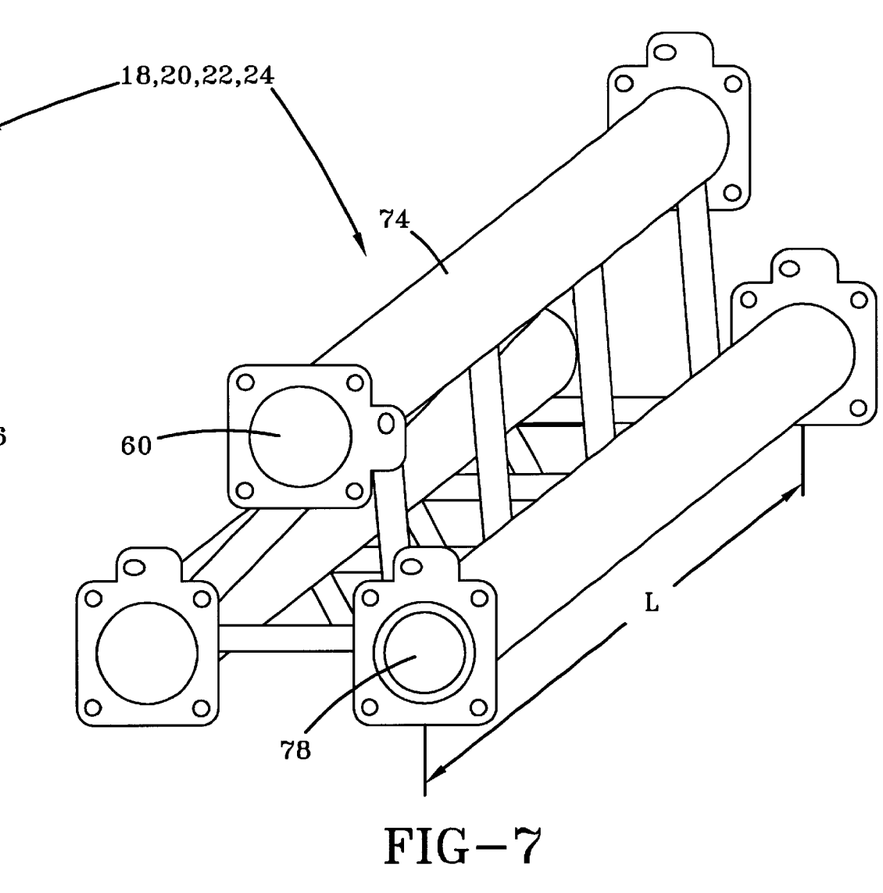
FIG. 7 is a perspective view of an embodiment of members that comprise the supporting structure of the current invention.
Figure 8:
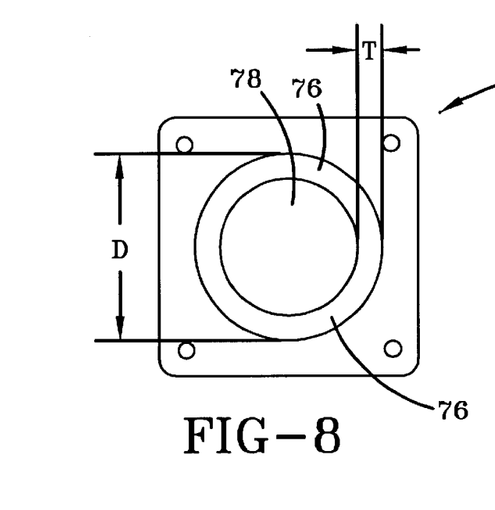
FIG. 8 is a cross-section of a member.
Figure 9:
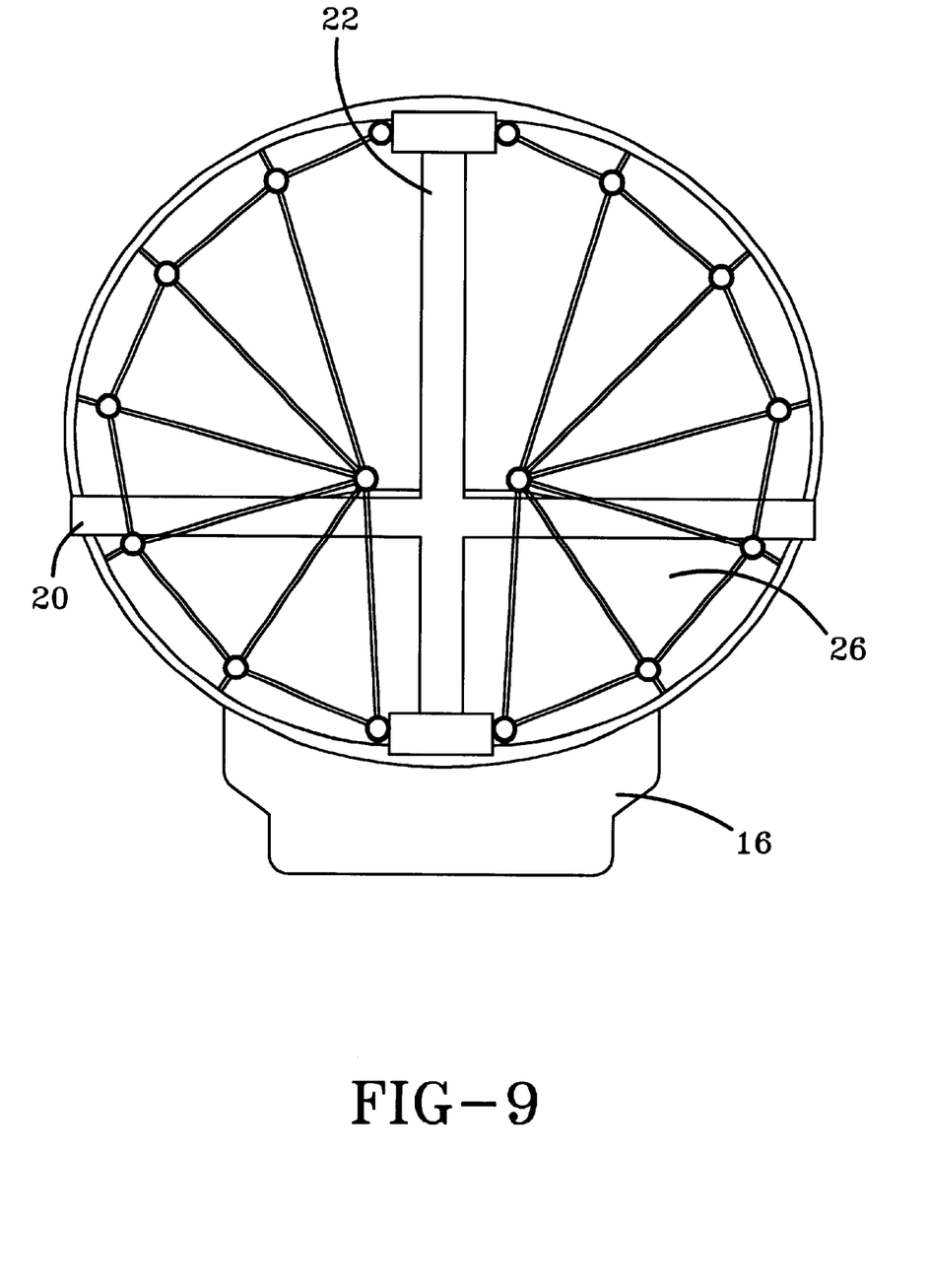
FIG. 9 is a cross-section of the current invention.

Wither reference to FIGS. 7 and 8, in the preferred embodiment, some of the members 18, 19, 20, 22, 24 comprise a laminated tube 74 having a diameter D of about seven-inches. Preferably, some of these members 18, 19, 20, 22, 24 are made out of a rigid yet lightweight material such as aluminum covered by graphite or the like. Some of the members 18, 19, 20, 22, 24 may have an aperture 60 coaxial along some or all of the length L of the tube 74. As shown in FIG. 7, a cross section may reveal a wall 76 having a thickness T between one ten-thousands of an inch and two inches. In one preferred embodiment, the wall 76 surrounds a foam core 78. While the dimension, configuration and composition of a preferred embodiment of some of the members has been described, applicant any of the same provided that they are chosen with sound engineering judgment.

With reference to FIGS. 2, 4, 9 and 10, the airship 10 also includes buoyant cells 26. The cells 26 may be insulated and are easily inflatable. They may be easily constructed out of a lightweight composite material. The cells 26 are able to expand and contract with the changes in altitude and temperature as the airship rises and descends. Each cell 26 comprises a flexible first chamber 28 and a flexible second chamber 30. Preferably, the first chamber 28 is made out of a material that minimizes leakage of the first gas. Additionally, because of the cells 26, in the preferred embodiment, the airship 10 is semi-buoyant without cargo 16.

With continuing reference to FIGS. 2, 4, 9 and 10, the flexible second chamber 30 is adjacent to the first chamber 28. A semi-rigid outer layer 32 is adjacent to the second chamber 30. Preferably, the first chamber 28 is filled with a first gas that is lighter than air and the second chamber 30 is filled with a second gas. The first lighter than air gas gives the airship static lift while the second gas is usually just atmospheric air. Each buoyant cell 26 also comprises a chamber valve 48 that allows air in the second chamber to pass out of the second chamber 30 when the first gas expands in the first chamber 28. The chamber valve 48 also allows air to pass back into the second chamber 30 when the first gas contracts in the first chamber 28. This allows the chambers to expand and contract with changes in atmospheric pressure.

As shown in FIG. 10, the fuselage 12 has a nose section 11, a tail section 13 and a mid-section 15 positioned between the nose and tail sections 11, 13. Within the mid-section 15, in the preferred embodiment, the airship 10 has sixteen cells 26, eight on each side. Because the cells 26 within the mid-section 15 are modular, construction and operating costs are minimized. Additionally, because the airship 10 utilizes static as well as dynamic lift, cells may be replaced while the airship is in flight with no loss of altitude. Moreover, more than half the cells 26 would need to materially malfunction before the airship would begin to descend at a slow rate. In the preferred embodiment, each buoyant cell 26 has a radius of about 62.5 feet.

Figure 2:
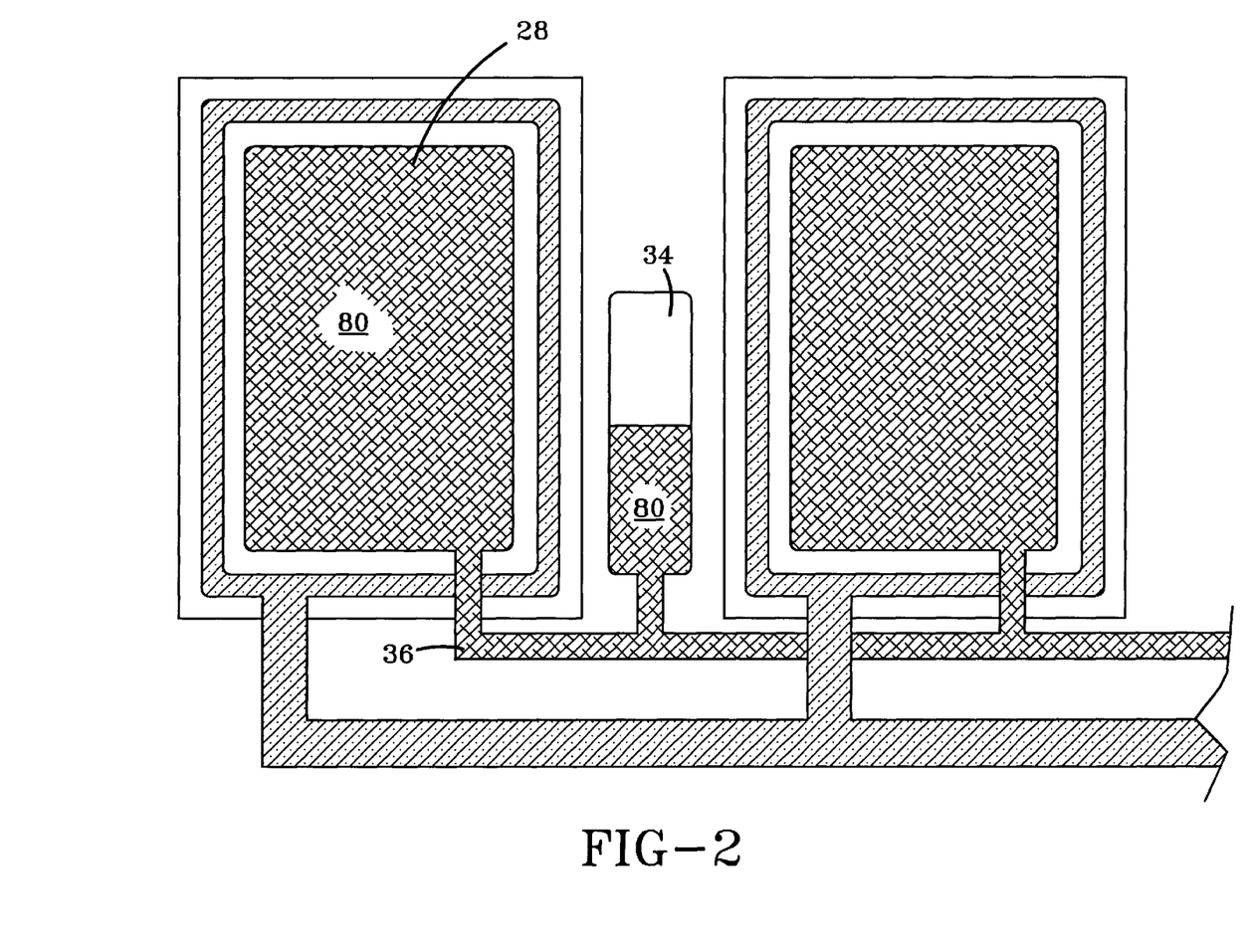
FIG. 2 shows a cross section of one embodiment of the cells of the current invention.

With reference to FIG. 2, a first container 34 may be included in the current invention. This first container 34 is operatively connected to the first chamber 28 by a valve 36. The valve 36 allows the first gas 80 to pass from the first chamber 28 into the first container 34. The valve 36 also allows the first gas 80 to pass from the first container 34 into the first chamber 28. Thus, helium may be captured in the container 34 when the airship 10 descends and reintroduced back into the first chamber 28 when the airship 10 ascends to a low pressure high altitude.

With reference to FIGS. 1, 5 and 10, the airship 10 also has a pair of wings 38 to provide dynamic lift to the airship 10. The wings 38 are connected on either side of the airship to the cross member 20 near the airship's 10 center of gravity. Each wing has a jet-assisted turbo prop engine 56. The jet engines assist in forward thrust to create dynamic lift. These jet engines will be computer controlled for use as a yaw control to dampen external aerodynamic forces. The wings also have ailerons, spoilers, leading edge slots, and flaps to provide more lift and control.

Preferably, a V-shape tail 54 is located at the rear of the current invention. This location helps the airship 10 to stay out of the orbital recirculation of slipstream in order to avoid unstable control and to reduce hull drag. Landing gear 52 is attached to the bottom of the fuselage 12 and is raised into the aircraft 10 during flight. The landing gear 52 allows the airship 10 to have optimal handling at conventional airports by minimizing its turning radius.

With reference to FIG. 6, for very high wind conditions, the airship 10 may have fastening means 50 to fasten the airship 10 to the ground. For instance, a hydraulic lift may come up from the ground into a socket 50 near the airship's center of gravity, thus allowing aircraft to remain stable in high wind conditions. The airship 10 also includes attaching means 46 to selectively attach cargo 16 to the airship 10. The attaching means 46 may attach the cargo to the airship 10 in any manner chosen with sound engineering judgment.

In the preferred embodiment, the airship 10 transports cargo 16 that is contained within a cargo container 40. The cargo container 40, which is discussed more fully below, has means to selectively externally attach the cargo container 40 to the airship 10. In the preferred embodiment, the attaching means 46 and a later to be described container attaching means 64 work in conjunction with each other to attach the cargo container 40 to the airship 10. This may be accomplished in any manner chosen with sound engineering judgment, but is preferably accomplished with mechanical means that hydraulically interlock.

Figure 3:
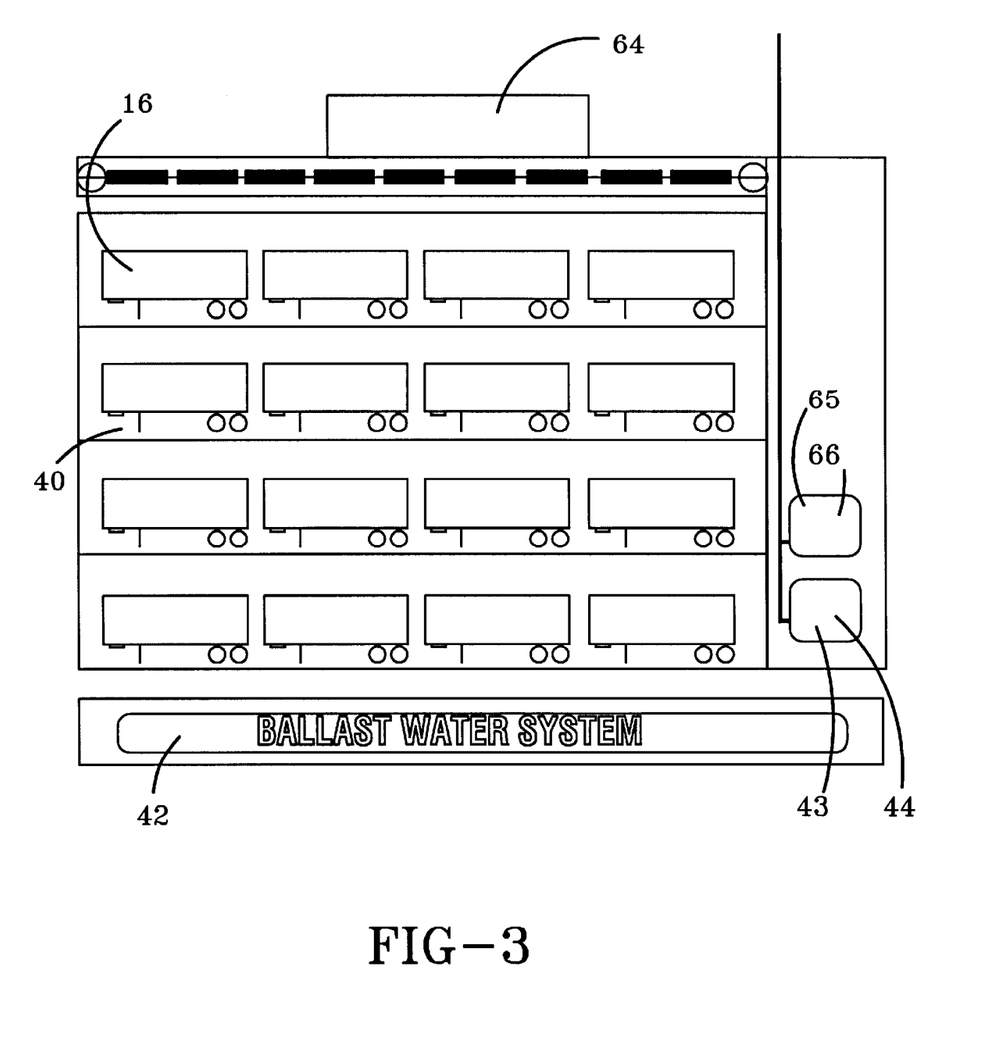
FIG. 3 is a side view of the cargo container of the current invention.
Figure 4:
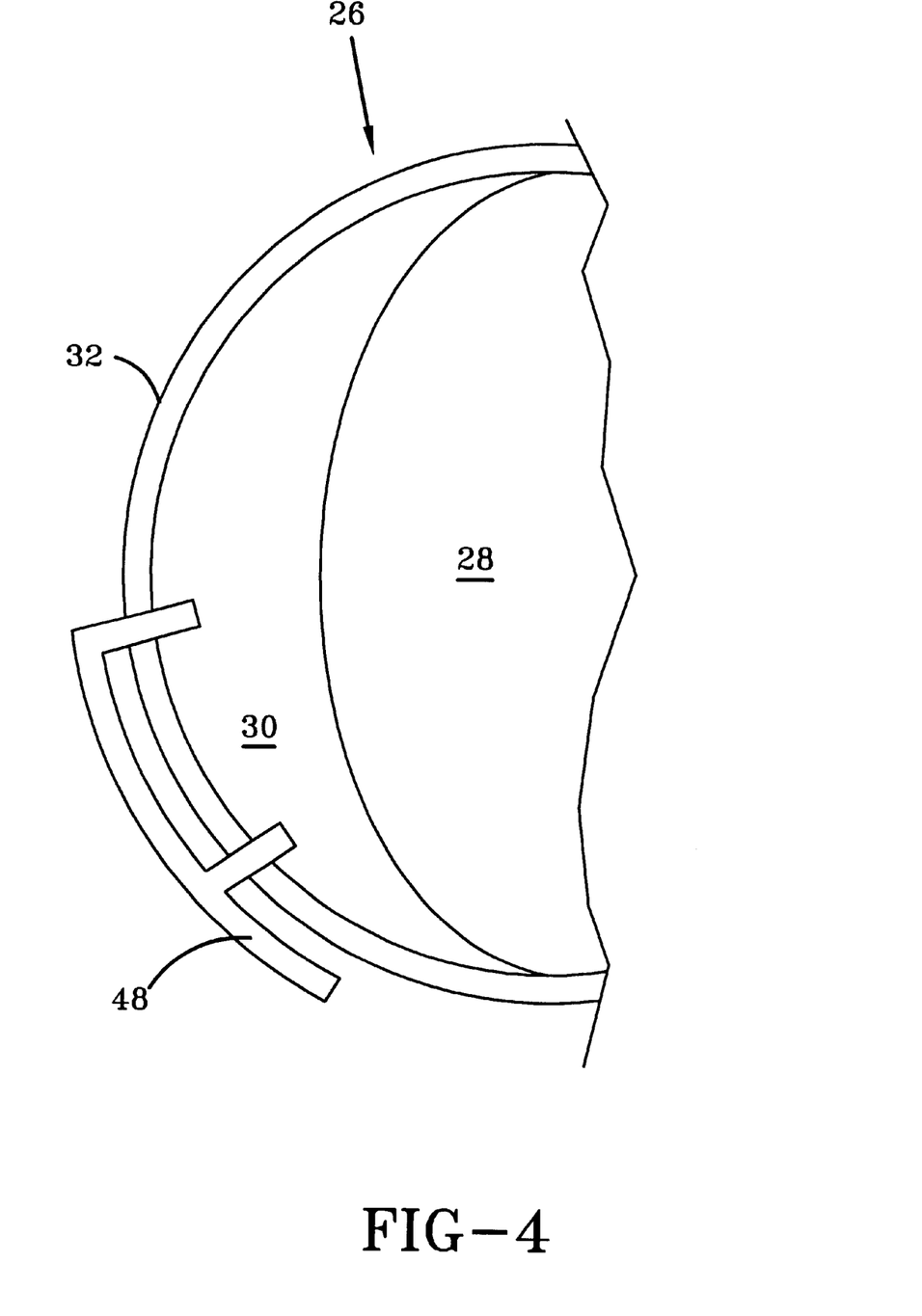
FIG. 4 shows a cross-section of the preferred embodiment of the cells of the current invention.

With reference to FIG. 3, the current invention also includes a cargo container 40 for use in conjunction with the airship 10. The cargo 16 to be transported by the airship 10 is comprised within the container 40 and the container 40 is selectively attachable to the airship 10. Preferably, the cargo is supported on removable pallets or containers for maximum room usage. For ease and efficiency of operation, cargo 16 should be preloaded into cargo containers 40. Loading would be accomplished by simply moving the airship 10 over the container, lowering it over the cargo by kneeling the landing gear 52, and then attaching the container 40. Airships 10 could load and unload in less than one hour.

The cargo container 40 comprises a cargo area 16 and the container attaching means 64 to selectively externally attach the container 40 to an airship 10. The cargo container 40 may further include, as shown in FIG. 3, a gas compartment 65 adapted to receive and hold a compressed gas 66 that is lighter than air when decompressed. The lighter than air gas provides lift to the airship 10 when the cargo container 40 is attached to the airship 10 and the gas is decompressed. The cargo container 40 may also comprise a ballast system 42 to ballast the airship 10 in a heavy wind, for example. The cargo container 40 may also include a fuel compartment 43 adapted to receive and hold a fuel 44 for the airship 10 so that the airship 10 does not need to remain on the ground to refuel.

Applicant anticipates that the specifications of the current invention may be varied in accordance with sound engineering judgment. In the preferred embodiment, the airship 10 is 800 feet in length by 125 feet in diameter and has a wingspan of 530 feet, a wing cord of 51 feet, a wing thickness of 1.5 feet, a wing area of 14,133 square feet. Cargo area is 40 feet high by 40 feet wide by 300 feet long. The aircraft would enclose 7 million cubic feet of helium in 18 cells and provide 478,000 pounds of buoyancy with a payload capability of approximately 400,000 pounds and a range of 10,000 miles. The airship could take off at 75 mph where that air speed would produce a 1,000,000 pounds of lift from the wings. This ship will have a cruising speed of over 200 mph at 18,000 feet, employing a lifting fuselage of about 200,000 pounds. The wings need to lift approximately 865,000 pounds at take off with maximum payload. As airspeed increases and the lift from fuselage and wings increases, it will be able to climb to cruising altitude quickly and offset the loss of lift from a fixed static buoyant cell, by increasing dynamic lift. Applicant anticipates changes to these.

Applicant anticipates numerous variations to the current invention. For instance, the dimensions of the airship 10 may be significantly changed. This may result in a toy airship, for example. The toy airship 10 may have dimension akin to that of a toy plane. The toy airship 10 may or may not be remotely controllable. Alternatively, the scaled down version of the airship 10 may be flown in indoor or outdoor stadiums for entertainment or advertising or other commercial purposes. Regardless of its use, a scaled down version of the airship 10 would maintain its substantial lifting capabilities. This would result in a miniature lifting means having a vast array of uses. For example, the airship 10 might be used for transporting people or other cargo out of dangerous environments, such as forest fires or spills of toxic materials. The miniature airship 10 might be used to fly promotional banners or indicia along beaches in the summer or over football stadiums. The miniature airship could also be used to lift construction materials to remote places, such as lifting building materials to the top of a ski mountain to facilitate the construction of a ski lodge.

While the invention has been described in connection with specific embodiments and applications, no intention to restrict the invention to the examples shown is contemplated. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. An airship comprising:

a fuselage; and, a supporting structure positioned internal to said fuselage, said supporting structure comprising, A) a first longitudinal member substantially side-to-side centered and top-to-bottom centered within said fuselage;

B) a cross member extending toward opposite sides of said fuselage; said cross member substantially perpendicular to and supportively connected to said first longitudinal member;

C) a plumb member substantially perpendicular to and supportively connected to said cross member and said first longitudinal member, wherein said first longitudinal member, said cross member and said plumb member are supportively connected substantially near said airship's center of gravity; and, D) a plurality of guide support members having first ends attached to said top portion of the plumb member and second ends attached to said first longitudinal member.

2. The airship of claim 1 wherein said supporting structure further comprises:

a second longitudinal member substantially side-to-side centered within a lower half of said fuselage, said second longitudinal member being substantially parallel to said first longitudinal member and being supportively connected to a first end of said plumb member.

3. The airship of claim 2 wherein said airship is semi-buoyant without cargo.

4. The airship of claim 2 further comprising:

a pair of wings each being supportively connected to an opposite end of said cross member, said pair of wings extending external to said fuselage.

5. The airship of claim 4 wherein at least a portion of one of said first longitudinal member, said cross member and said plumb member is formed of laminated tube.

6. The airship of claim 5 wherein at least a portion of said laminated tube has a foam core.

7. The airship of claim 4 wherein each of said pair of wings comprise at least a first engine.

8. The airship of claim 7 wherein each of said pair of wings comprise at least a first aileron, at least a first spoiler, and at least a first flap all for use in providing lift and flight control.

9. The airship of claim 4 further comprising:

a v-shaped tail located at the rear end of said airship.

10. The airship of claim 1 further comprising:

a supporting structure positioned internal to said fuselage, said supporting structure comprising,
- A) a first longitudinal member substantially side-to-side centered and top-to-bottom centered within said fuselage;
- B) a cross member extending toward opposite sides of said fuselage; said cross member substantially perpendicular to and supportively connected to said first longitudinal member;
- C) a plumb member substantially perpendicular to and supportively connected to said cross member and said first longitudinal member, wherein said first longitudinal member, said cross member and said plumb member are supportively connected substantially near said airship's center of gravity; and,
- D) a second longitudinal member substantially side-to-side centered within a lower half of said fuselage, said second longitudinal member being substantially parallel to said first longitudinal member and being supportively connected to a first end of said plumb member; and, a plurality of buoyant cells positioned internal to said fuselage, each of said plurality of buoyant cells comprising:
- A) a flexible first chamber filled with a first gas that is lighter than air;
- B) a flexible second chamber filled with a second gas that is atmospheric air and positioned adjacent said first chamber; said first and second chambers preventing said first and second gases from mixing; and,
- C) at least a first chamber valve operatively connected to said second chamber, said first chamber valve permitting said second gas to pass out of said second chamber when said first gas expands within said first chamber; said first chamber valve also permitting said second gas to enter said second chamber when said first gas contracts within said first chamber.

11. The airship of claim 10 further comprising:

cargo attaching means mounted external to said fuselage and supportably connected to said supporting structure; and, a cargo container adapted to receive associated cargo, said cargo container comprising container attaching means mounted external to said cargo container and adapted to be selectively attached to said cargo attaching means.

12. The airship of claim 11 further comprising:

a pair of wings each being supportively connected to an opposite end of said cross member, said pair of wings extending external to said fuselage.

13. The airship of claim 12 further comprising:

at least a first container operatively connected to said first chamber using at least a first container valve, said first container valve permitting said first gas to pass out of said first chamber and enter said first container when said airship is descending, said first container valve permitting said first gas to pass out of said first container and enter said first chamber when said airship is ascending; and, wherein said fuselage has a nose section, a tail section and a mid-section positioned between said nose section and said tail section, wherein a plurality of modular buoyant cells are positioned internal to said mid-section of said fuselage, each of said plurality of modular buoyant cells being substantially identical.

14. The airship of claim 13 wherein said cargo container further comprises:

a cargo area for use in receiving associated cargo;

a ballast system for use in ballasting said airship;

a gas compartment adapted to receive and hold in a compressed state a lighter than air gas, said gas compartment being operatively connected to said fuselage to selectively provide lift to said airship when said lighter than air gas is decompressed and fed into said fuselage; and, a fuel compartment adapted to receive fuel, said fuel compartment being operatively connected to a power means used to power said airship to selectively refuel said power means.

15. The airship of claim 1 wherein first and second guide supports form acute angles A1 and A2, respectively, with said longitudinal member, said angle A1 being greater than angle A2.

16. The airship of claim 15 wherein said guide supports are arranged symmetrically about said plumb member.

17. The airship of claim 16 further comprising:

an additional plurality of guide support members having first ends attached to the bottom portion of the plumb member and second ends attached to the first longitudinal member.

18. The airship of claim 17 wherein said second ends of said guide support members having first ends attached to said top portion of said plumb member are attached at substantially the same longitudinal position along said longitudinal member as said second ends of said guide support members having first ends attached to said bottom portion of said plumb member.

19. The airship of claim 18 wherein said guide support members having first ends attached to said top portion of said plumb member are substantially the same length as said guide support members having first ends attached to said bottom portion of said plumb member.

20. The airship of claim 18 wherein said plumb member has a substantially greater cross-sectional size than any other vertically positioned member of said supporting structure.

21. The airship of claim 18 further comprising:

landing gear that is attached to said fuselage.

* * * * *